United States Patent
Tanner et al.

(10) Patent No.: US 6,523,421 B1
(45) Date of Patent: Feb. 25, 2003

(54) CORIOLIS FLOWMETER HAVING BI-METALLIC PROCESS CONNECTIONS

(75) Inventors: Terry Rock Tanner, Lyons, CO (US); Ernest Dale Lister, Westminster, CO (US); Robert Barclay Garnett, Arvada, CO (US); Michael Benton Shelton, Longmont, CO (US)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 09/345,658

(22) Filed: Jun. 30, 1999

(51) Int. Cl.⁷ .................................................. G01F 1/84
(52) U.S. Cl. .................................................. 73/861.357
(58) Field of Search ...................... 73/861.357, 861.355; 340/606; 29/516, 861.356, 861.354, 861.38, 861.37

(56) References Cited

U.S. PATENT DOCUMENTS

| | | |
|---|---|---|
| 5,136,135 A | 8/1992 | Bratschun et al. |
| 5,271,281 A * | 12/1993 | Mattar et al. ............ 73/861.38 |
| 5,323,955 A | 6/1994 | Bergmann et al. |
| 5,365,794 A | 11/1994 | Hussain et al. |
| 5,476,013 A | 12/1995 | Hussain et al. |
| 5,691,485 A * | 11/1997 | Endo et al. ............ 73/861.357 |

FOREIGN PATENT DOCUMENTS

| | | |
|---|---|---|
| EP | 0 342 104 A1 | 11/1989 |
| EP | 0 375 590 A2 | 6/1990 |
| EP | 0 866 317 A1 | 9/1998 |
| WO | WO 97/35168 | 9/1997 |

* cited by examiner

*Primary Examiner*—Harshad Patel
(74) *Attorney, Agent, or Firm*—Faegre & Benson LLP

(57) ABSTRACT

Method and apparatus defining bi-metallic process connections for a Coriolis flowmeter that are metallurgically bonded to form a sealed structure without the use of an O-ring or other elastomeric seal. The process connections comprise a first metal metallurgically bonded to a dissimilar metal to form a sealed process connection. The bond between the first metal and the dissimilar metal is outside the process material pathway so that the process connections in conjunction with the flowmeter form a flow path enclosed by a single metal.

27 Claims, 4 Drawing Sheets

CORIOLIS FLOWMETER HAVING BI-METALLIC PROCESS CONNECTIONS

FIELD OF THE INVENTION

The invention relates to a Coriolis flowmeter. More particularly, the invention relates to a method and apparatus for a Coriolis flowmeter having bi-metallic process connections formed from two dissimilar metals that are metallurgically bonded to form a sealed process connection.

PROBLEM

It is known to use Coriolis effect mass flowmeters to measure mass flow and other information of process materials flowing through a pipeline as disclosed in U.S. Pat. No. 4,491,025 issued to J. E. Smith, et al. of Jan. 1, 1985 and Re. 31,450 to J. E. Smith of Feb. 11, 1982. These flowmeters have one or more flow tubes of a straight or a curved configuration. Each flow tube configuration in a Coriolis flowmeter has a set of natural vibration modes, which may be of a simple bending, torsional, radial, or coupled type. Each flow tube is driven to oscillate at resonance in one of these natural modes. The natural vibration modes of the vibrating material filled systems are defined in part by the combined mass of the flow tubes and the process material flowing through the flow tubes. Process material flows into the flowmeter from a connected pipeline on the inlet side of the flowmeter. The process material is then directed through the flow tube or flow tubes and exits the flowmeter to a pipeline connected on the outlet side.

A driver applies a vibrational force to the flow tube. The force causes the flow tube to oscillate. When there is no process material flowing through the flowmeter, all points along the flow tube oscillate with an identical phase. As process material begins to flow through the flow tube, Coriolis accelerations cause each point along the flow tube to have a different phase with respect to other points along the flow tube. The phase on the inlet side of the flow tube lags the driver, while the phase on the outlet side leads the driver.

In an example of a straight tube configuration, a balance bar surrounding the flow tube balances the flow tube and isolates the sensing portion of the flow tube from external influences to provide a specific frame of reference for the sensing portion. Pick off sensors at two different points on the flow tube produce sinusoidal signals representative of the motion of the flow tube at the two points. A phase difference in the two signals received from the sensors is calculated in units of time. The phase difference between the two sensor signals is proportional to the mass flow rate of the process material flowing through the flow tube or flow tubes.

The flow tube and surrounding balance bar are housed in a case. A process connection is connected to each end of the flow tube and to each end of the case. Process connections are fittings that connect the flowmeter to a pipeline or other process material delivery system. A flange is a specific example of a process connection.

In some cases, flowmeters are constructed from dissimilar metals, such as steel and titanium to improve flow meter design. The use of dissimilar metals in flowmeters permits the flowmeters to withstand harsh environments of use such as extreme temperatures, chemical attack, pipeline loading and process pressures. In the context of this application, dissimilar metals are metals that have substantially different properties including hot ductility and coefficients of thermal expansion. The substantially different properties prevent joining of the dissimilar metals by conventional welding techniques.

In one example, a flowmeter case may be constructed from carbon steel and include a stainless steel skin affixed around the exterior surface. The process connections are constructed from stainless steel. The flow tube on the other hand, may be constructed from titanium. Construction of the case from carbon steel, which costs less than stainless steel, lowers manufacturing costs. The stainless steel skin affixed around the case protects the carbon steel from rust and corrosion. The titanium flow tube provides a sanitary metallic flow path for process material.

Different metals have different corrosion tolerances and corrode at varying time intervals. Therefore, it is desirable that process material flowing through the flowmeter only contact a single metal. One prior art method of providing a flow path made of a single metal is to extend the flow tube through the process connection and terminate it flush with the outer edge of the process connection. A titanium insert configured to fit into a recessed portion on the outer face of the process connection is used to join the titanium flow tube to the end of the process connection. The flow tube is welded to the insert by conventional welding techniques. The insert is retained in the recessed portion of the process connection by the weld between the flow tube and the insert. In the prior art the titanium insert is not bonded to the stainless steel process connection. An elastomeric seal, such as an O-ring or silicone, is fitted into the joint between the insert and process connection. This seal is critical because it prevents exterior process materials from leaking into the interior case of the flowmeter.

A first problem with this prior art solution is that the joint between the insert and the process connection is a weak point in the flowmeter. The elastomeric seal breaks down at a faster rate than other surrounding welded joints. This results in a premature failure of the flowmeter because the seal cannot be replaced without destroying the entire flowmeter.

A second problem with this prior art solution is that the joint between the titanium insert and the stainless steel process connection also fails prematurely due to galvanic corrosion, resulting in premature meter failure. Furthermore, the galvanic corrosion is accelerated where the process material is corrosive.

A third problem with this prior art solution is present in applications where the flowmeter case is relied on to provide a secondary containment for the process material in the event the flow tube fails. The O-ring seal or other elastomeric seal is not designed to handle such process material, especially in large pressurized volumes present during a flow tube failure. This problem is further compounded by the fact that the need for secondary containment typically arises during applications where the process material is highly corrosive or toxic.

SOLUTION

The above and other problems are solved and an advance in the art is made by the method and apparatus of the invention wherein a bi-metallic process connection made from a first metal and a dissimilar metal that are metallurgically bonded to form a sealed process connection for a Coriolis flowmeter. A first advantage is that the need for an elastomeric seal is eliminated. A second advantage is that the bonded first metal and dissimilar metal provide superior corrosion resistance. This extends the useful life of the flowmeter in highly corrosive environments.

A Coriolis flowmeter embodying the method and apparatus of the invention includes at least one flow tube made of a first metal and a process connection made of the first metal metallurgically bonded to a dissimilar metal to form a sealed structure. A central aperture extends through the process connection and is enclosed by at least a portion of the first metal in the process connection. An end of the flow tube is affixed to the first metal in the process connection to provide a flow path enclosed by the first metal.

A first exemplary embodiment of the present invention is a stainless steel flange that includes a titanium insert metallurgically bonded to a first end of the flange. The flange includes a central recessed portion in the first and that connects to the pipeline. The central recessed portion circumscribes a central aperture passing through the main body of the flange. The recessed portion is configured to receive a cylindrical titanium insert that has a central aperture configured to mate with the central aperture of the flange. The titanium insert is metallurgically bonded into the central recessed portion of the flange to form a sealed process connection of the present invention. A second end of the flange is welded to the end of the stainless steel flowmeter case by conventional welding techniques. The titanium flow tube is welded to the titanium insert by conventional welding techniques to form a flow path enclosed by a single metal.

In a second possible exemplary embodiment of the present invention the insert includes a stainless steel first face and a titanium second face metallurgically bonded to form a composite stainless steel/titanium insert. The stainless steel portion of the insert is welded in the recessed portion of the main body by conventional welding techniques and the titanium portion of the insert is welded to the titanium flow tube by conventional welding techniques.

In a third possible exemplary embodiment of the present invention, the process connection comprises a sanitary fitting made of titanium and stainless steel. A titanium face is metallurgically bonded to a stainless steel first end of the process connection to form a sealed process connection of the present invention. The stainless steel end of the sanitary fitting is welded to the stainless steel flowmeter case by conventional welding techniques. The flow tube extends through the process connection and is welded to the titanium face of the sanitary fitting by conventional welding techniques to form a flow path enclosed by a single metal.

Aspects of the invention include a method and apparatus defining a Coriolis flowmeter comprising at least one flow tube formed from a first metal;
  a balance bar coaxial with said at least one flow tube and having ends connected to said at least one flow tube to partially enclose said at least one flow tube;
  a driver coupled to said at least one flow tube and said at least one balance bar to vibrate said at least one flow tube and said at least one balance bar in phase opposition;
  sensors affixed to said at least one flow tube to measure oscillations and transmit information about said oscillations to meter electronics responsive to said driver vibrating said at least one flow tube and at least one balance bar;
  a process connection formed from said first metal and at least one dissimilar metal metallurgically bonded to said first metal;
  an aperture through said process connection from a second end that connects to a case to a first end that connects to a pipeline wherein said first metal of said process connection encloses at least a portion of said aperture; and
  an end of said at least one flow tube affixed to said first metal of said process connection enclosing said aperture to provide a flow path enclosed by said first metal.

A second aspect of the invention includes a Coriolis flowmeter wherein said process connection is a flange further comprising an insert bonded to said first end of said aperture to form said sealed structure.

A third aspect of the invention includes a Coriolis flowmeter further comprising a recessed portion around said aperture on said first end of said process connection that receives said insert.

A fourth aspect of the invention includes a Coriolis flowmeter wherein said at least one flow tube extends through said aperture of said process connection from said second end to said first end and connects to said insert.

A fifth aspect of the invention includes a Coriolis flowmeter wherein said insert is bonded to said process connection to form said sealed structure by brazing.

A sixth aspect of the invention includes Coriolis flowmeter wherein said insert is a bi-metallic insert formed by explosion bonding.

A seventh aspect of the invention includes a Coriolis flowmeter wherein said bi-metallic insert is bonded to said process connection to form said sealed structure by conventional welding techniques.

A eighth aspect of the invention includes a Coriolis flowmeter wherein said insert is bonded to said process connection to form said sealed structure by projection welding.

A ninth aspect of the invention includes a Coriolis flowmeter wherein said insert is bonded to said process connection to form said sealed structure by inertia welding.

A tenth aspect of the invention includes a Coriolis flowmeter wherein the process connection is a sanitary fitting.

An eleventh aspect of the invention includes a Coriolis flowmeter wherein said sanitary fitting comprises a face formed from said first metal;
  a main body formed from said at least one dissimilar metal, and
  said face and said main body are bonded together to form said sealed structure and define said aperture.

A twelfth aspect of the invention includes a Coriolis flowmeter wherein said first metal is titanium.

A thirteenth aspect of the invention includes a Coriolis flowmeter wherein said dissimilar metal is stainless steel.

A fourteenth aspect of the invention includes a Coriolis flowmeter wherein said face of said sanitary fitting and said main body of said sanitary fitting are bonded together to form said sealed structure by explosion bonding.

A fifteenth aspect of the invention includes a Coriolis flowmeter wherein said face of said sanitary fitting and said main body of said sanitary fitting are bonded together to form said sealed structure by brazing.

A sixteenth aspect of the invention includes a Coriolis flowmeter wherein said face of said sanitary fitting and said main body of said sanitary fitting are bonded together to form said sealed structure by projection welding.

A seventeenth aspect of the invention includes a Coriolis flowmeter wherein said face of said sanitary fitting and said main body of said sanitary fitting are bonded together to form said sealed structure by inertia welding.

DESCRIPTION OF THE DRAWINGS

The above and other features of a Coriolis flowmeter having a bi-metallic process connection metallurgically bonded are described in the detailed description below and in the following drawings.

DETAILED DESCRIPTION

Figure 1:
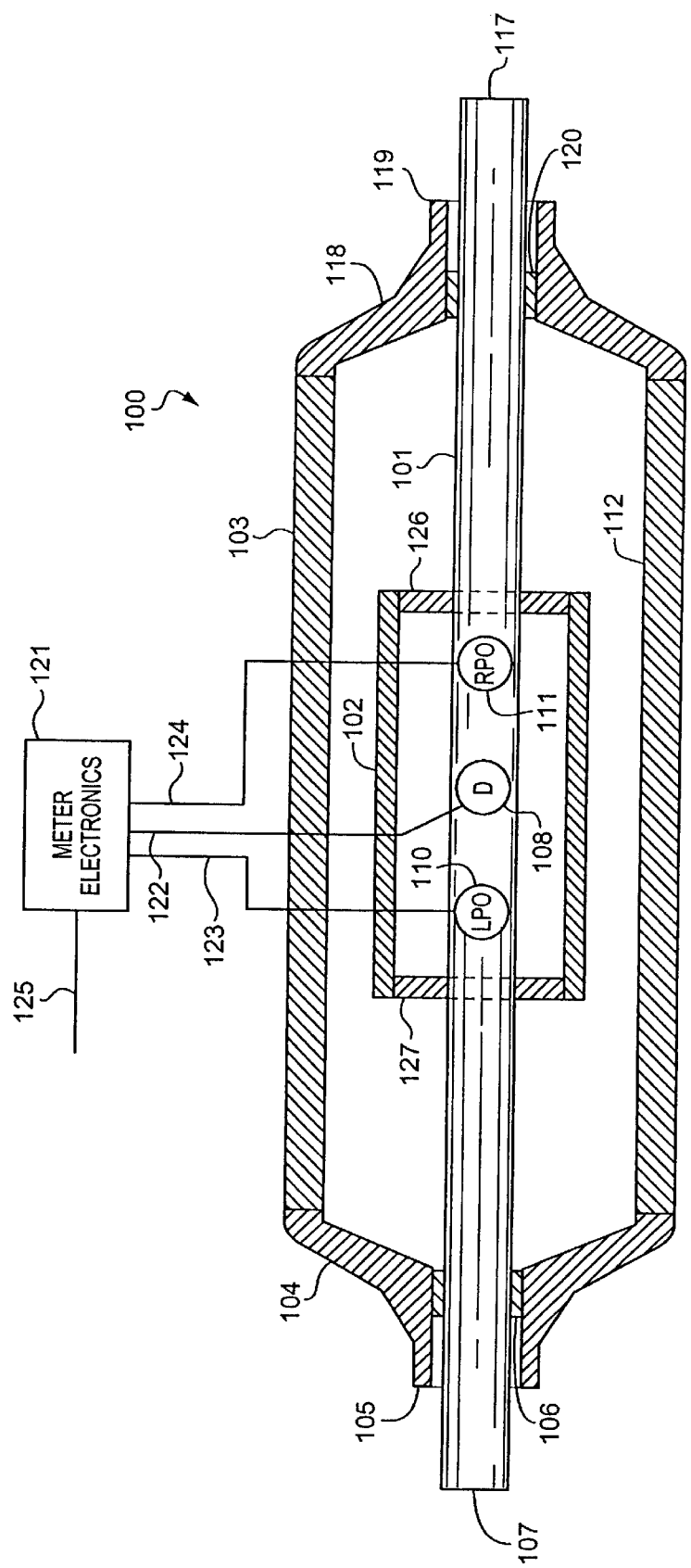
FIG. 1 depicts a cutaway view of a Coriolis flowmeter embodying the present invention.

The present invention will now be described more fully hereinafter with reference to the accompanying drawings, in which embodiments of the invention are shown. Those skilled in the art will appreciate that the invention may be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

Coriolis Flowmeter FIG. 1

FIG. 1 discloses a straight tube Coriolis flowmeter 100. Although shown in conjunction with a straight tube Coriolis flowmeter 100, those skilled in the art will recognize that this invention may also be used in conjunction with flow tubes having a curved configuration. Coriolis flowmeter 100 includes a case 103 enclosing a balance bar 102 and flow tube 101. Flow tube 101 is constructed from a first metal, which provides a sanitary flow path and is ideal for producing the Coriolis response of flow tube 101. Balance bar 102 is coaxial to the longitudinal axis of flow tube 101. Balance bar 102 connects to flow tube 101 by brace bars 126 and 127. Case ends 104 and 118 are connected on opposite ends of case 103 and include integrally formed neck elements 105 and 119 respectively.

In preferred embodiments, flow tube 101 and balance bar 102 are made of titanium. Case 103 is constructed from carbon steel and is welded by conventional techniques to stainless steel case ends 104 and 118. A stainless steel skin (not shown) encloses case 103 and connects to stainless steel case ends 104 and 118 to form a homogeneous stainless steel exterior.

Flow tube 101 extends through neck elements 105 and 119. Flow tube 101 is dimensioned to extend beyond neck elements 105 and 119 to mate with the face of insert 202, illustrated in FIG. 2. Flow tube 101 has an input end 107 and an output end 117 and is supported as it passes through neck elements 105 and 119 by brace elements 106 and 120, which sealably engage flow tube 101. Brace elements 106 and 120 circumscribe the inner diameter of neck elements 105 and 119 interior to neck elements 105 and 119 respectively. A driver (D) 108, left velocity sensor (LPO) 110, and right velocity sensor (RPO) 111 are centrally connected to flow tube 101.

Meter electronics 121 supplies a signal via path 122 to driver 108 to vibrate flow tube 101 transversely at the resonant frequency of the material filled flow tube 101. Drier 108 vibrates flow tube 101 and balance bar 102 in phase opposition. The combined process material flow and vibrations imparted to flow tube 101 by driver 108 induce the Coriolis response in flow tube 101 that is detected by LPO 110 and RPO 111. Meter electronics 121 receives signals from LPO 110 and RPO 111 via paths 123 and 124. The phase difference between the signals of LPO 110 and RPO 111 represent information pertaining to the process material flow. Meter electronics 121 processes the received signals and generates output information on its path 125 pertaining to process material flow.

Figure 2:
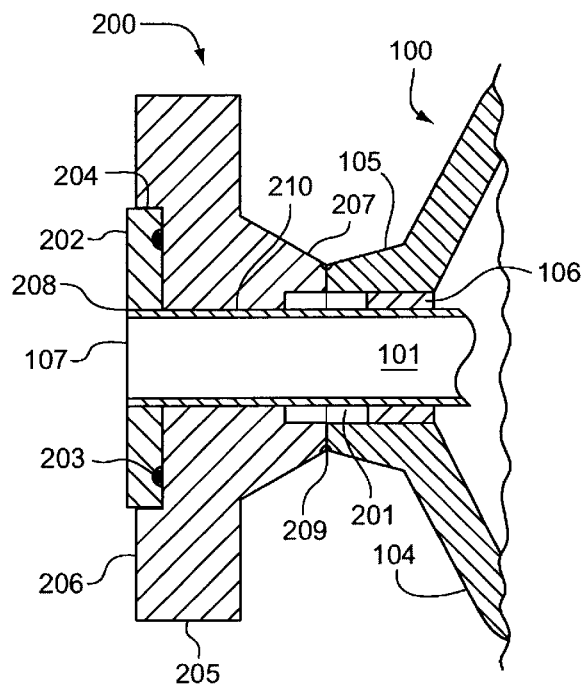
FIG. 2 depicts a cross sectional view of a prior art flange process connection connected to an end of a flowmeter.

Prior Art Process Connection FIG. 2

FIG. 2 illustrates a cross sectional view of a prior art flange process connection 200 connected to one end of flowmeter 100. Process connections are used to connect flow tube 101 to case 103 and to connect flowmeter 100 to a pipeline or other process material delivery system (not shown).

Process connection 200 comprises main body 205. Main body 205 includes a first end 206 that connects to a pipeline and a second end 207 that connects to flowmeter 100. Main body 205 has a central aperture 210 extending through main body 205 from first end 206 to second end 207. First end 206 includes a centrally located recessed portion 204 circumscribing aperture 210. Recessed portion 204 is configured to receive titanium insert 202. Titanium insert 202 may protrude out beyond first end 206, as illustrated by FIG. 2. The connection of flow tube 101 is accomplished by inserting process connection 200 over flow tube 101 from second end 207 so that flow tube 101 extends through aperture 210 and terminates flush with the outer face of insert 202. Process connection 200 is connected to case end 104 at joint 209. The connection is welded by conventional welding techniques, although other bonding methods such as brazing may also be used.

A void 201 is defined by the space between the exterior surface of flow tube 101, intermediate the interior surface of aperture 210. Void 201 permits process connection 200 to be connected to neck element 105 without destruction of other meter components. Since the coupling involves a heating operation, such as brazing or welding, flow tube 101 is subject to less thermal stress by virtue of void 201. Void 201 prevents heat from the welding or brazing operation from overheating other elements of flow meter 100.

Flow tube 101 is connected to process connection 200 by a conventional titanium weld between insert 202 and input end 107 to form joint 208. It should be noted that the connection of titanium flow tube 101 to titanium insert 202 forms a solid titanium flow path for process material passing through flowmeter 100.

Insert 202 is not bonded to main body 205 of process connection 200. Insert 202 relies on the weld between insert 202 and flow tube 101 to secure insert 202 in recessed portion 204. Since flowmeters are often used in damp environments, O-ring 203 forms a seal between insert 202 and main body 205 to prevent flowmeter contamination from the leakage of moisture into the interior cavity of case 103. Those skilled in the art will appreciate that glue or other elastomeric seal may also be used in place of O-ring 203.

Process Connections of the Present Invention FIGS. 3–8

From the following description, those skilled in the art will recognize numerous other configurations that are applicable to the present invention described, and thus, the following description is for the purpose of illustration and not limitation. Those skilled in the art will also appreciate that using the principles of the present invention, the process connections could be constructed in numerous sizes and configurations as a matter of design choice and process material delivery system accommodated.

Figure 3:
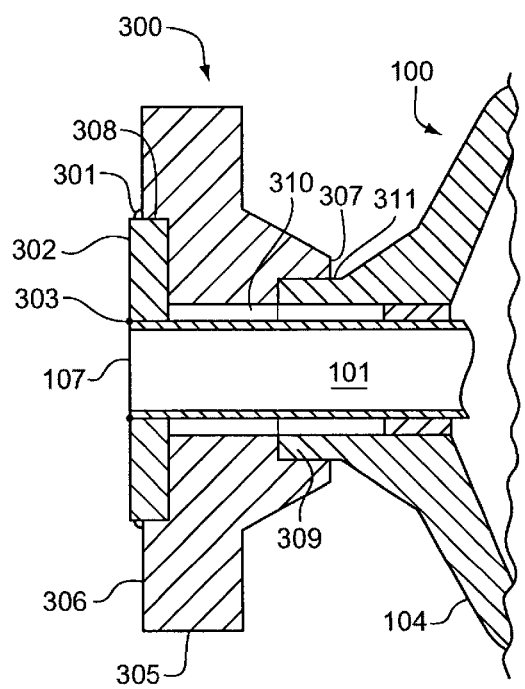
FIG. 3 depicts a cross sectional view of a bi-metallic flange process connection embodying the present invention made of a first metal and a dissimilar metal that are metallurgically bonded by a brazing process.

FIG. 3 illustrates a cross sectional view of process connection 300 embodying the present invention connected to an end of flowmeter 100. In preferred embodiments, process connection 300 is a flange comprising a main body 305 made of stainless steel, and an insert 302 made of titanium. Those skilled in the art will appreciate that the insert portion of the embodiments of the present invention are not limited to a circular configuration, but rather, can be numerous other configurations and sizes as a matter of design choice.

A central aperture 310 extends from a first end 306 to a second end 307 of main body 305 and mates with a central aperture in insert 302. Insert 302 is configured to fit into a recessed portion 308 and is metallurgically bonded to main body 305 to form a sealed process connection without relying on O-ring 203 or other elastomeric seal. Advantageously, the metallurgical bond between insert 302 and main body 305 eliminates a weak link in flowmeter 100 and prevents premature failure of flowmeter 100 due to corrosion or vibrational forces. This is a distinct advancement of the art as it eliminates the use of the elastomeric seal, which extends meter life and permits application of flowmeter 100 in highly corrosive environments.

Brazed Process Connection

Process connection 300 is constructed from a forging process followed by machining to the required specifications and industry standards. Additional machining is performed to form central recessed portion 308 defining aperture 310. Another feature of process connection 300 is that neck 309 of case end 104 is modified to reduce void 201 so that a socket welded process connection can be used at joint 311. Socket welds are commonly known in the art and provide a method for aligning process connection 300 and case end 104. The socket weld also adds mechanical support at joint 311. Advantageously the socket weld at joint 311 is farther away from flow tube 101 because of the arcuate shape of neck 309. This not only protects flow tube 101 in the same way as the larger void 201, but also produces a stronger joint between process connection 300 and case end 104.

Those skilled in the art will recognize other suitable brazing techniques, although furnace brazing is preferably used to metallurgically bond insert 302 to main body 305. Furnace brazing is a process that joins two metals by heating them to the brazing temperature in the presence of filler material. The filler material should have a melting point above 450° C. (840° F.) and below the melting point of the surfaces being joined. The filler material is distributed through the joint by capillary action.

Furnace brazing is used to braze joint 301 at the outer diameter of insert 302 and the inner top diameter of recessed portion 308. Flow tube 101 is connected to flowmeter 100 by a conventional titanium weld between insert 302 and input end 107 to form joint 303. Advantageously, furnace brazing insert 302 and main body 305 can be accomplished inexpensively with a high degree of success. Also advantageously, the brazing can be performed before main body 305 is attached to flowmeter 100. This prevents the brazing process from damaging other joints and meter components. Yet another advantage is that bi-metallic joint 301 is outside the process flow path so that flow tube 101 and insert 302 form a flow pathway enclosed by a single metal.

Figure 4:
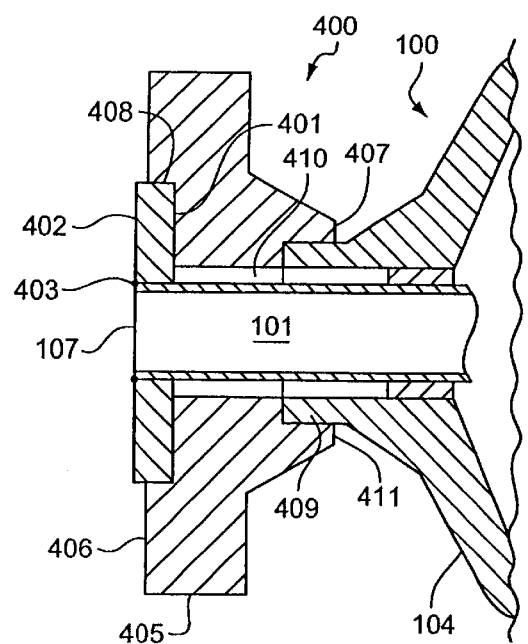
FIG. 4 depicts a cross sectional view of a bi-metallic flange process connection embodying the present invention made of a first metal and a dissimilar metal that are metallurgically bonded by a projection welding process.

Projection Welded Process Connection FIG. 4

FIG. 4 illustrates a cross sectional view of process connection 400 embodying the present invention connected to an end of flowmeter 100. In preferred embodiments, process connection 400 is a flange comprising a main body 405 made of stainless steel, and an insert 402 made of titanium.

Process connection 400 is forged and machined to produce a flange meeting the required specifications and industry standards. A central aperture 410 extends from a first end 406 to a second end 407 of main body 405 and mates with a central aperture in insert 402. Insert 402 is configured to fit into recessed portion 408. Process connection 400 also includes a socket weld at joint 411 between neck 409 and second end 407 of process connection 400.

Insert 402 is metallurgically bonded to main body 405 by a projection welding process. Projection welding is a sold state welding that is unique in its ability to join materials while keeping the materials in a solid state during the entire welding process. Those skilled in the art will appreciate that this is an important feature of the present invention because materials such as titanium form detrimental properties when a liquid state is produced during the welding process.

Projection welding uses force and electric current. An electric current is passed through the two pieces to be joined in the presence of an applied force. In the context of the present invention, the two pieces are insert 402 and main body 405. Insert 402 and main body 405 are projection welded at joint 401. Flow tube 101 is connected to insert 402 by a conventional titanium weld at joint 403.

Figure 9:
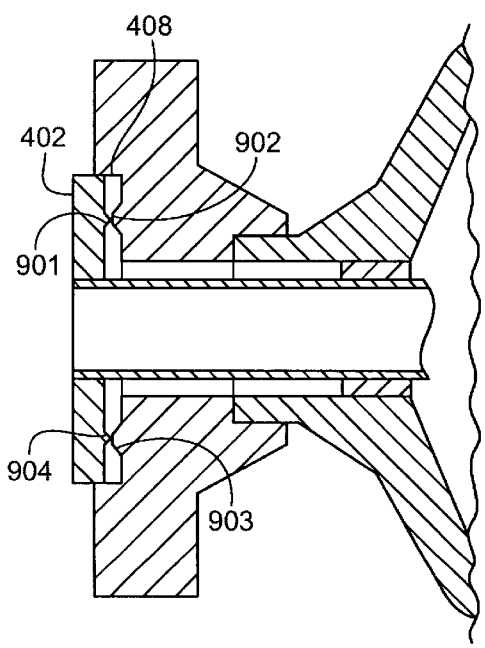
FIG. 9 depicts the process connection of FIG. 4 prior to bonding.

On FIG. 9, projections 901 and 904 formed on insert 402 and projections 902 and 903 on the bottom of recessed portion 408 form two concentric rings of triangular cross-section. Projections 901, 902, 903 and 904 force the electric current to pass through a constricted geometry and cause an increase in current density, to produce local heating. When the materials are heated, their yield strengths are reduced and the applied force causes the materials to weld together. The applied force is great enough to cause the titanium and stainless steel, which are softened by the heating, to bond at an atomic level.

To utilize projection welding to join insert 402 and main body 405 of process connection 400, the heat must be balanced so that both insert 402 and main body 405 have similar yield strengths at the time of forging. The amount of heat is driven by the difference in the two materials thermal conductivity and hot ductility. This is important because the process is dependent on electric current for local heating, and titanium and stainless steel have different thermal conductivity and hot ductility. If the strengths of the two materials are very different at the time of forging, the harder material, stainless steel in this case, will not bond at the atomic level with the softer titanium. The titanium melts down before enough heat is applied to soften the stainless steel. Through experimentation, inventors have found that the hot ductility of Grade V titanium at the forging temperature retains enough of its strength and is close enough to the hot ductility of stainless steel to bond titanium insert 402 to stainless steel main body 405.

The length of time is determined by the need for a short thermal cycle. In preferred embodiments, the length of time should be in the range of 50 milliseconds to 130 milliseconds and preferably is 83 milliseconds.

The amplitude of electric current is determined by the amount of plastic flow between titanium insert 402 and stainless steel main body 405. The plastic flow is measured as upset, which is the amount the projections collapse during the process. Preferably, the electric cycle should be 200,000 amps for 5 cycles of 60 hertz alternating current that is fully rectified to direct current.

Projection welding is preferred over brazing for joining insert 402 and main body 405 as it produces a sealed weld with a higher degree of success. Projection welding produces a higher continuity at joint 401's surface. Brazing leaves an obvious line of braze material at the joint that may contain small crevices. These crevices could result in leakage of process material into the inner cavity of flowmeter 100 in some applications.

Specific advantages of projection welding also include without limitation, the production of a flow path wherein bi-metallic joint 401 is outside the process flow path and projection welding of insert 402 to main body 405 before main body 405 is attached to flowmeter 100 to prevent damage to other elements of flowmeter 100.

Inertia Welded Process Connections FIGS. 5, 6, 7 and 8

Figure 5:
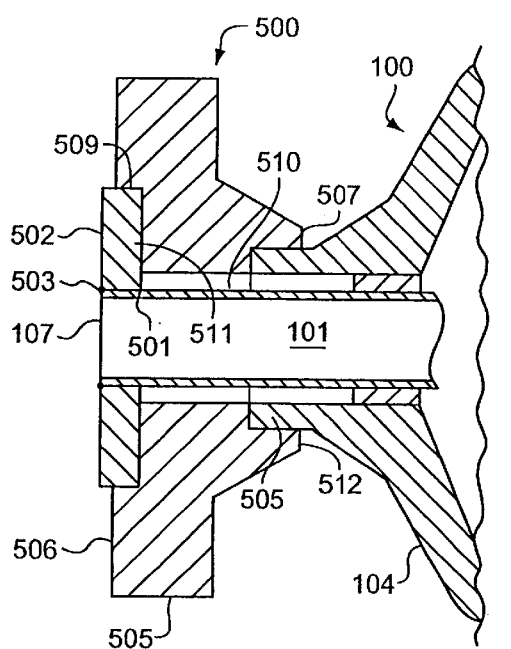
FIG. 5 depicts a cross sectional view of a bi-metallic flange process connection embodying the present invention made of a first metal and a dissimilar metal that are metallurgically bonded by an inertia welding process.

FIG. 5 illustrates a cross sectional view of process connection 500 embodying the present invention, connected to an end of flowmeter 100. In preferred embodiments, process connection 500 is a flange comprising a main body 505 made of stainless steel, and an insert 502 made of titanium.

Process connection 500 is forged and machined to produce a flange meeting the required specifications and industry standards. A central aperture 510 extends from a first end 506 to a second end 507 of main body 505 and mates with a central aperture in insert 502. Insert 502 is configured to fit into recessed portion 509. Process connection 500 also includes a socket weld at joint 512 between neck 505 and second end 507 of process connection 500. Insert 502 is metallurgically bonded in recessed portion 509 by an inertia welding process and is modified to accommodate this process.

Inertia welding is a process whereby a first piece of material is joined with a second piece of material in the following manner. The first piece of material is spun at a higher angular velocity than the second piece of material. The two pieces are then brought into contact using a large force. The heat generated by the friction forces when the materials come into contact cause the materials to bond together. The resulting joint 501 lies in a plane that is normal to the axis of rotation between the bottom of insert 502 and lip 511 in recessed portion 509. Flow tube 101 is connected to flowmeter 100 by a conventional titanium weld at joint 503.

To utilize inertia welding the area of heat generation should be reduced to a point where joint 501 can be cooled before significant diffusion occurs. Without reducing the surface area at joint 501, more heat is generated than can be conducted away before significant diffusion and residual stresses due to thermal expansion occur. Diffusion of iron, the major component of stainless steel, into titanium, without reducing the surface area, causes joint 501 to be brittle. The thermal expansion differences induce large residual stresses in joint 501 during cooling, and limit joint 501's ability to withstand shock loads or high cycle fatigue loading.

Figure 6:
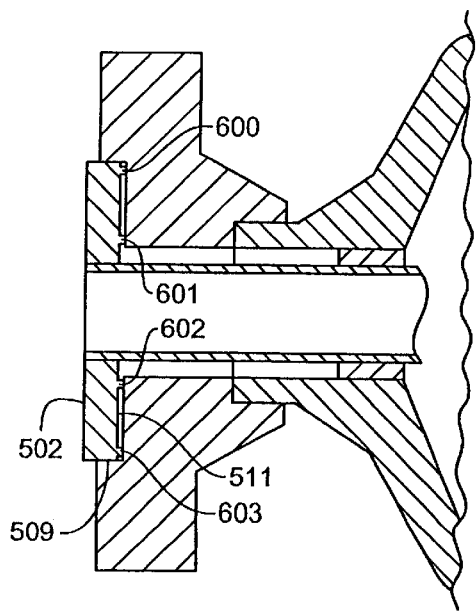
FIG. 6 depicts a cross sectional view of a modified insert used to form the bi-metallic flange process connection of FIG. 5.

On FIG. 6, insert 502 is modified to add protrusions 600, 601, 602 and 603 to reduce the contact surface between insert 502 and lip 511 of recessed portion 509. Protrusions 600, 601, 602 and 603 reduce the area of heat generation to a point where joint 501 can be cooled before significant diffusion occurs.

Figure 7:
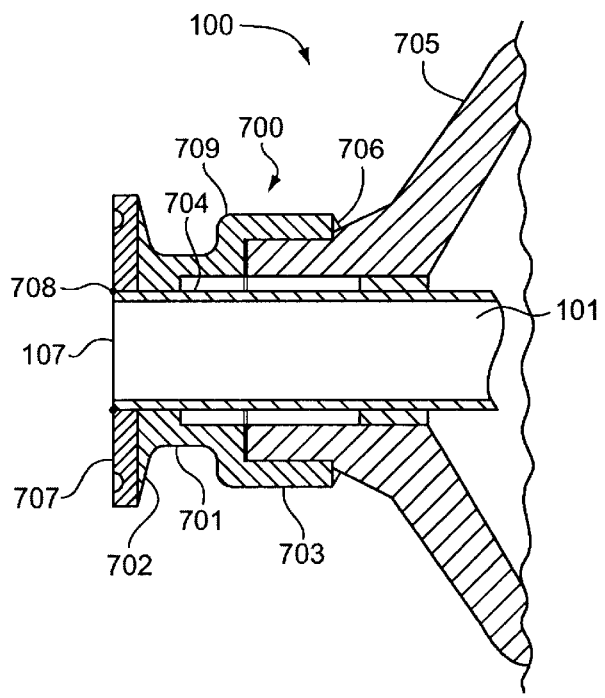
FIG. 7 depicts a cross sectional view of a bi-metallic sanitary fitting process connection embodying the present invention made of a first metal and a dissimilar metal that are metallurgically bonded to form a sealed process connection.

Sanitary Fitting FIG. 7

FIG. 7 illustrates a cross sectional view of process connection 700 embodying the present invention connected to an end of flowmeter 100. In preferred embodiments, process connection 700 is a sanitary fitting comprised of a titanium face 707 and stainless steel main body 709. Sanitary fittings are process connections used by industries that require absolute cleanliness such as the dairy and pharmaceutical industries. Sanitary fittings connect to a pipeline using a clamp member (not shown) around neck 701. The clamp member allows the sanitary fitting to be detachably connected to the pipeline to allow periodic draining of the meter. Sanitary fittings also reduce the possibility that process fluid will be trapped at the connection point.

Process connection 700 is formed by inertia welding a titanium plate to a thicker piece of stainless steel stock. The bonded titanium plate and stainless steel stock are machined to form process connection 700 meeting the required specifications and industry standards. Main body 709 includes an integrally formed neck 701 between a first end 702 and a second end 703. A central aperture 704 passes through first end 702 and second end 703.

As to alternative embodiments, those skilled in the art will appreciate that face 707 could be bonded to main body 709 by other processes including without limitation, brazing, projection welding or explosion bonding. Those skilled in the art will also appreciate that the dimensions of face 707 and main body 709 may be varied as a matter of design choice.

Process connection 700 connects to flowmeter 100 by conventional welding techniques at joint 706. Flow tube 101 connects to process connection 700 by a conventional titanium weld at joint 708.

Explosion Bonded Flange

Figure 8:
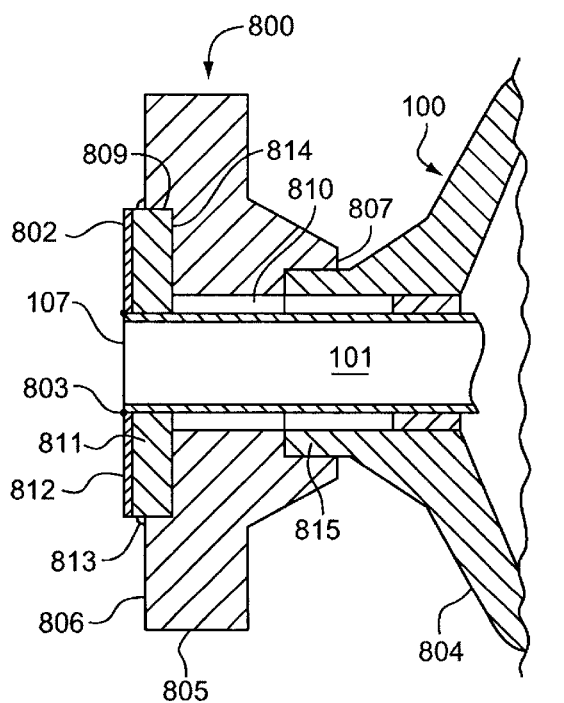
FIG. 8 depicts a cross sectional view of a bi-metallic flange process connection embodying the present invention made of a first metal and a dissimilar metal that are metallurgically bonded by an explosion bonding process.

FIG. 8 illustrates a cross sectional view of process connection 800 embodying the present invention connected to an end of flowmeter 100. In preferred embodiments, process connection 800 is a flange comprising a main body 805 made of stainless steel, and an insert 802 made of titanium and stainless steel.

Process connection 800 is forged and machined to produce a flange meeting the required specifications and industry standards. A central aperture 810 extends from a first end 806 to a second end 807 of main body 805 and mates with a central aperture in insert 802. Insert 802 is configured to fit into recessed portion 809. Process connection 800 also includes a socket weld at joint 815 between neck 804 and second end 807 of process connection 800.

Insert 802 is not only metallurgically bonded to flange body 805, but insert 802 is a bi-metallic insert comprised of stainless steel and titanium. Insert 802 is formed by machining insert 802 from a titanium/stainless steel plate produced by explosion bonding a plate of titanium to a plate of stainless steel.

Explosion bonding, also known in the art as explosion welding, is a solid state process that uses the forces of controlled detonations to accelerate one metal plate into another metal plate to create an atomic bond. Explosion bonding is a cold welding process that allows metals to be joined without losing their pre-bonded properties. Advantageously, explosion bonding is used to join dissimilar metals forming a high-quality joint. The joint includes high mechanical strength, is ultra-high vacuum tight, and can withstand drastic thermal excursions.

The titanium/stainless steel insert 802 permits the use of traditional welding techniques to bond insert 802 to main body 805 and flow tube 101. Insert 802 is placed in aperture 809 with stainless steel half 811 mating with bottom surface 814 of recessed portion 809 and titanium half 812 representing the exposed face portion of insert 802. Stainless steel half 811 is welded by traditional welding techniques to the stainless steel main body 805 at joint 813. Titanium half 812 of insert 802 is welded by traditional welding techniques to input end 107 of flow tube 101 at joint 803.

Advantages to this embodiment include the production of an exceptionally high corrosion resistant insert for joining flow tube 101 to main body 805 to form a flow path enclosed by a single metal. Similar to other embodiments, the bi-metallic joint between the stainless steel and titanium of insert 802, is outside the process flow path. Also, the welding of insert 802 to main body 805 can be performed before flange 800 is attached to flowmeter 100 to prevent damage to other elements of the flowmeter 100.

The above is a description of a Coriolis flowmeter having metallurgically bonded bimetallic process connections. It is envisioned that those skilled in the art can and will design alternative metallurgically bonded bimetallic process connections for Coriolis flowmeters that infringe on the present invention as set forth in the claims below either literally or through the Doctrine of Equivalents.

What is claimed is:

1. A Coriolis flowmeter, comprising:
    at least one flow tube formed from a first metal;
    a casing formed from at least one dissimilar metal and configured to enclose said at least one flow tube;
    a first process connection formed from said first metal and said at least one dissimilar metal metallurgically bonded to said first metal, said first process connection having:
        a first end that includes said first metal,
        a second end that includes said at least one dissimilar metal, and
        an aperture extending through said first process connection from said first end of said first process connection to said second end of said first process connection; and
    a second process connection formed from said first metal and said at least one dissimilar metal metallurgically bonded to said first metal, said second process connection having:
        a first end that includes said first metal,
        a second end that includes said at least one dissimilar metal, and
        an aperture extending through said second process connection from said first end of said second process connection to said second end of said second process connection;
    said at least one flow tube extending through said aperture of said first process connection with a first end of said at least one flow tube affixed to said first end of said first process connection and extending through said aperture of said second process connection with a second end of said at least one flow tube affixed to said first end of said second process connection to provide a flow path enclosed by said first metal;
    said casing having a first end affixed to said second end of said first process connection and having a second end affixed to said second end of said second process connection to enclose said at least one flow tube with said at least one dissimilar metal.

2. The Coriolis flowmeter of claim 1 wherein said first process connection comprises an insert formed from said first metal, said insert forms said first end of said first process connection.

3. The Coriolis flowmeter of claim 2 further comprising a recessed portion around said aperture on said first end of said first process connection, said recessed portion formed from said at least one dissimilar metal and metallurgically bonded to said insert.

4. The Coriolis flowmeter of claim 3 further comprising a joint between said insert and said recessed portion, said joint generated by brazing.

5. The Coriolis flowmeter of claim 3 wherein said insert is a bi-metallic insert formed by explosion bonding.

6. The Coriolis flowmeter of claim 5 further comprising a joint between said bi-metallic insert and said recessed portion, said joint generated by conventional welding techniques.

7. The Coriolis flowmeter of claim 3 further comprising a joint between said insert and said recessed portion, said joint generated by projection welding.

8. The Coriolis flowmeter of claim 3 further comprising a joint between said insert and said recessed portion, said joint generated by inertia welding.

9. The Coriolis flowmeter of claim 2 wherein said at least one flow tube extends through said aperture of said first process connection from said second end of said first process connection to said first end of said first process connection and connects to said insert.

10. The Coriolis flowmeter of claim 1 wherein the first process connection comprises a sanitary fitting.

11. The Coriolis flowmeter of claim 10 wherein said sanitary fitting comprises:
    a face formed from said first metal;
    a main body formed from said at least one dissimilar metal, and
    said face and said main body are bonded together to form a sealed structure and define said aperture of said first process connection.

12. The Coriolis flowmeter of claim 11 wherein said first metal is titanium.

13. The Coriolis flowmeter of claim 11 wherein said at least one dissimilar metal is stainless steel.

14. The Coriolis flowmeter of claim 11 wherein said face and said main body are bonded together to form said sealed structure by explosion bonding.

15. The Coriolis flowmeter of claim 11 wherein said face and said main body are bonded together to form said sealed structure by brazing.

16. The Coriolis flowmeter of claim 11 wherein said face and said main body are bonded together to form said sealed structure by projection welding.

17. The Coriolis flowmeter of claim 11 wherein said face of said sanitary fitting and said main body of said sanitary fitting are bonded together to form said sealed structure by inertia welding.

18. A method of producing a Coriolis flowmeter comprised of at least one flow tube formed from a first metal and a casing formed from at least one dissimilar metal, the method comprising the steps of:

forming a first process connection from said first metal and said at least one dissimilar metal metallurgically bonded to said first metal so that said first process connection includes:
a first end that includes said first metal,
a second end that includes said at least one dissimilar metal, and
an aperture extending through said first process connection from said first end of said first process connection to said second end of said first process connection;

forming a second process connection from said first metal and said at least one dissimilar metal metallurgically bonded to said first metal so that said second process connection includes:
a first end that includes said first metal,
a second end that includes said at least one dissimilar metal, and
an aperture extending through said second process connection from said first end of said second process connection to said second end of said second process connection;

extending said at least one flow tube of said Coriolis flowmeter through said aperture of said first process connection and through said aperture of said second process connection;

connecting a first end of said at least one flow tube to said first end of said first process connection and connecting a second end of said at least one flow tube to said first end of said second process connection to provide a flow path enclosed by said first metal; and connecting a first end of said casing to said second end of said first process connection and connecting a second end of said casing to said second end of said second process connection to enclose said at least one flow tube with said at least one dissimilar metal.

19. The method of claim 18, wherein forming a first process connection comprises the step of:
brazing the first metal to the at least one dissimilar metal.

20. The method of claim 19, wherein the brazing step comprises the step of:
furnace brazing the first metal to the at least one dissimilar metal.

21. The method of claim 20, wherein the furnace brazing step comprises the steps of:

applying heat to melt a filler material; and
distributing the filler material in a joint between said first metal and said dissimilar metal.

22. The method of claim 18, wherein forming a first process connection comprises the step of:
explosion bonding said first metal to said at least one dissimilar metal.

23. The method of claim 22, wherein the explosion bonding step comprises the steps of:
explosion bonding said first metal to said at least one dissimilar metal to form a bi-metallic insert; and
welding said at least one dissimilar metal of said bi-metallic insert to a main body of said first process connection made of said at least one dissimilar metal.

24. The method of claim 18, wherein forming a first process connection comprises the step of:
projection welding said first metal to said at least one dissimilar metal.

25. The method of claim 24, wherein the projection welding step comprises the steps of:
forming first projections on said first metal of said first process connection;
forming second projections on said at least one dissimilar metal of said first process connection;
applying a force to compress said first metal and said at least one dissimilar metal of said first process connection together at said first and second projections; and
applying an electric current to said first metal and to said at least one dissimilar metal of said first process connection.

26. The method of claim 18, wherein forming a first process connection comprises the step of:
inertia welding said first metal to said at least one dissimilar metal.

27. The method of claim 26, wherein the inertia welding step comprises the steps of:
forming protrusions on said first metal of said first process connection;
spinning said first metal and said at least one dissimilar metal of said first process connection, wherein one of said first metal and said at least one dissimilar metal of said first process connection is spun at a higher angular velocity than the other one of said first metal and said at least one dissimilar metal of said first process connection; and
forcing said first metal and said at least one dissimilar metal of said first process connection together as said first metal and said at least one dissimilar metal of said first process connection are spinning.

* * * * *

UNITED STATES PATENT AND TRADEMARK OFFICE
CERTIFICATE OF CORRECTION

PATENT NO. : 6,523,421 B1
DATED : February 25, 2003
INVENTOR(S) : Terry Rock Tanner et al.

It is certified that error appears in the above-identified patent and that said Letters Patent is hereby corrected as shown below:

Column 3,
Line 11, replace "includes a central recessed portion in the first and that" with
-- includes a central recessed portion in the first end that --

Column 6,
Line 13, replace "resonant frequency of the material filled flow tube 101. Drier" with
-- resonant frequency of the material filled flow tube 101. Driver --

Column 8,
Line 31, replace "a projection welding process. Projection welding is a sold" with
-- a projection welding process. Projection welding is a solid --

Column 12,
Lines 24-26, replace "4. The Coriolis flowmeter of claim 3 further comprising a joint between said insert and said recessed portion, said joint generated by brazing." with
-- 4. The Coriolis flowmeter of claim 2 wherein said at least one flow tube extends through said aperture of said first process connection from said second end of said first process connection to said first end of said first process connection and connects to said insert. --
Lines 27-28, replace "5. The Coriolis flowmeter of claim 3 wherein said insert is a bi-metallic insert formed by explosion bonding." with -- 5. The Coriolis flowmeter of claim 3 further comprising a joint between said insert and said recessed portion, said joint generated by brazing. --
Lines 29-32, replace "6. The Coriolis flowmeter of claim 5 further comprising a joint between said bi-metallic insert and said recessed portion, said joint generated by conventional welding techniques." with -- 6. The Coriolis flowmeter of claim 3 wherein said insert is a bi-metallic insert formed by explosion bonding. --
Lines 33-35, replace "7. The Coriolis flowmeter of claim 3 further comprising a joint between said insert and said recessed portion, said joint generated by projection welding." with -- 7. The Coriolis flowmeter of claim 6 further comprising a joint between said bi-metallic insert and said recessed portion, said joint generated by conventional welding techniques. --

UNITED STATES PATENT AND TRADEMARK OFFICE
CERTIFICATE OF CORRECTION

PATENT NO.    : 6,523,421 B1
DATED         : February 25, 2003
INVENTOR(S)   : Terry Rock Tanner et al.

It is certified that error appears in the above-identified patent and that said Letters Patent is hereby corrected as shown below:

Column 12 (cont'd),
Lines 36-38, replace "8. The Coriolis flowmeter of claim 3 further comprising a joint between said insert and said recessed portion, said joint generated by inertia welding." with -- 8. The Coriolis flowmeter of claim 3 further comprising a joint between said insert and said recessed portion, said joint generated by projection welding. --
Lines 39-43, replace "9. The Coriolis flowmeter of claim 2 wherein said at least one flow tube extends through said aperture of said first process connection from said second end of said first process connection to said first end of said first process connection and connects to said insert." with -- 9. The Coriolis flowmeter of claim 3 further comprising a joint between said insert and said recessed portion, said joint generated by inertia welding. --

Signed and Sealed this

Ninth Day of September, 2003

JAMES E. ROGAN
*Director of the United States Patent and Trademark Office*